United States Patent [19]

Mandell

[11] E Re. 30,382

[45] Reissued Aug. 26, 1980

[54] ASSEMBLY FOR SEALING AND PRESSURE EQUALIZATION OF A SUBMERSIBLE HOUSING

[75] Inventor: Ronald D. Mandell, Elkhorn, Wis.

[73] Assignee: Sta-Rite Industries, Inc., Delavan, Wis.

[21] Appl. No.: 951,968

[22] Filed: Oct. 16, 1978

Related U.S. Patent Documents

Reissue of:

[64] Patent No.: 4,015,633
Issued: Apr. 5, 1977
Appl. No.: 623,499
Filed: Oct. 17, 1975

[51] Int. Cl.[2] ..... F16L 55/00; B65D 7/42

[52] U.S. Cl. ..... 138/89; 138/109; 92/98 R; 220/67; 310/87; 417/424

[58] Field of Search ..... 138/109, 96 R, 96 T, 138/110, 103, 30, 26, 89; 277/65; 310/87–89; 220/67; 417/902, 424; 92/98 R

[56] References Cited

U.S. PATENT DOCUMENTS

| | | | |
|---|---|---|---|
| 1,157,041 | 10/1915 | Reynolds | 138/89 |
| 1,253,773 | 1/1918 | Bint | 220/326 |
| 2,325,616 | 8/1943 | Landweber | 138/96 R |
| 2,350,640 | 6/1944 | Rorke | 220/307 |
| 2,444,520 | 7/1948 | Marsh | 350/159 |
| 2,715,418 | 8/1955 | Van Derbeck | 137/510 |
| 2,737,205 | 3/1956 | Stringfield | 138/96 R |
| 2,962,612 | 11/1960 | Lung | 138/30 |
| 3,056,427 | 10/1962 | Higgins | 16/2 |
| 3,255,367 | 6/1966 | Schaefer | 310/87 |
| 3,350,585 | 10/1967 | Maynard | 310/87 |
| 3,578,027 | 5/1971 | Zopfi | 138/89 |
| 3,817,420 | 6/1974 | Heisler | 220/60 |
| 3,821,969 | 7/1974 | Sinko | 138/89 |
| 3,983,902 | 10/1976 | Lord | 138/30 |

OTHER PUBLICATIONS

Century Electric Bulletin 1480, File 14–180 p. 1, revised 7/70, St. Louis, Mo., Century Electric Co. 63166.

*Primary Examiner*—Houston S. Bell, Jr.
*Attorney, Agent, or Firm*—Mason, Kolehmainen, Rathburn & Wyss

[57] ABSTRACT

An assembly for sealing and pressure equalization of a submersible motor housing having an open end includes a formed, sheet metal cup including a cylindrical band portion and a base portion with an aperture therethrough. The assembly further includes an elastomeric diaphragm having a side wall that lies against the band portion of the cup and is adhesively secured thereto. The cup includes latching tabs extending from the band portion of the cup. The tabs snap into recesses fabricated in the end of the housing to hold the cup telescoped within the open end of the housing. The portion of the diaphragm secured to the band portion is sandwiched between the band portion and the housing wall and seals against the housing.

11 Claims, 4 Drawing Figures

34
10
24
42
22
40
28
26
18
32
14
20
36
16
30
38
44
58
12
60
62
66
68
56
52
50
54
48
46
2

44
50
52
48
54
56
10
16
58
46
68
12
66

16
52
12
58
44
60
62
64
66
68
50
54
46
48

16
52A

ASSEMBLY FOR SEALING AND PRESSURE EQUALIZATION OF A SUBMERSIBLE HOUSING

Matter enclosed in heavy brackets [ ] appears in the original patent but forms no part of this reissue specification; matter printed in italics indicates the additions made by reissue.

The present invention relates to improvements in structure for sealing the housing of a submersible device such as a motor for a submersible pump and for equalizing fluid pressures internally and externally of the housing.

Submersible pumps are used to pump fluids such as water from a well. A housing enclosing an electric motor for operating such a pump is immersed in the fluid within the well, and can be subjected to substantial fluid pressures depending upon the depth to which it is submerged. A typical submersible pump motor assembly includes a housing containing an electrical motor together with electrical circuitry for interconnecting the motor with a power source. In addition to the various structural components of the motor assembly, the interior of the housing contains a fluid which might in some instances be water but which often takes the form of hydraulic fluid, or oil.

In many instances, for example when an oil filled motor assembly is submersed in a water well, it is necessary to seal the motor housing to isolate the fluids within and outside of the housing from one another. Substantial pressure differentials may exist between the interior and the exterior of the housing creating a tendency for leakage of fluids into the housing and also resulting in a possibility of collapse or damage to the housing and/or seals.

To counteract this destructive pressure differential, it has been proposed not only to seal the housing but also to equalize the pressures within and outside of the housing. One approach which has been employed is illustrated in U.S. Pat. No. 2,881,013 wherein there is disclosed a structure including a bellows which expands and contracts in response to the pressure differential. Another known method comprises utilizing a cast metal housing cap member that captures a cupshaped diaphragm between the cap and the motor housing end wall upon insertion of the cast part into the housing. The diaphragm is exposed on one side to fluid within the housing and is vented on the other side to fluid in the well in order to pressurize the interior of the housing to a pressure equal to the exterior pressure. Such prior art approaches involve complex and expensive structures as well as undesirably expensive manufacturing and assembly procedures.

Among the important objects of the present invention are to provide an improved assembly for sealing and pressure equalization of a fluid-filled, submersible housing; to provide an assembly which is simple and inexpensive; to provide an assembly which is easily and economically manufactured and assembled; and to overcome the above noted and other disadvantages of prior art arrangements.

In brief, in accordance with the above and other objects of the present invention there is provided an assembly for sealing and pressure equalization of a submersible, fluid-filled device such as a motor for a submersible pump. The motor includes a housing with a generally cylindrical wall defining an open end. A retaining means including a cylindrical band member with a shape adapted to interfit with the housing end wall is latched in telescoping relation with the end wall by means of latching structure formed on the housing wall and the band member. A cup-shaped diaphragm includes a cylindrical side wall sandwiched between the band member and the housing wall and pressed into sealing engagement with the housing wall.

The above and other objects and advantages of the present invention will appear from the following detailed description of a preferred embodiment of the invention illustrated in the accompanying drawing, wherein.

Figure 1:
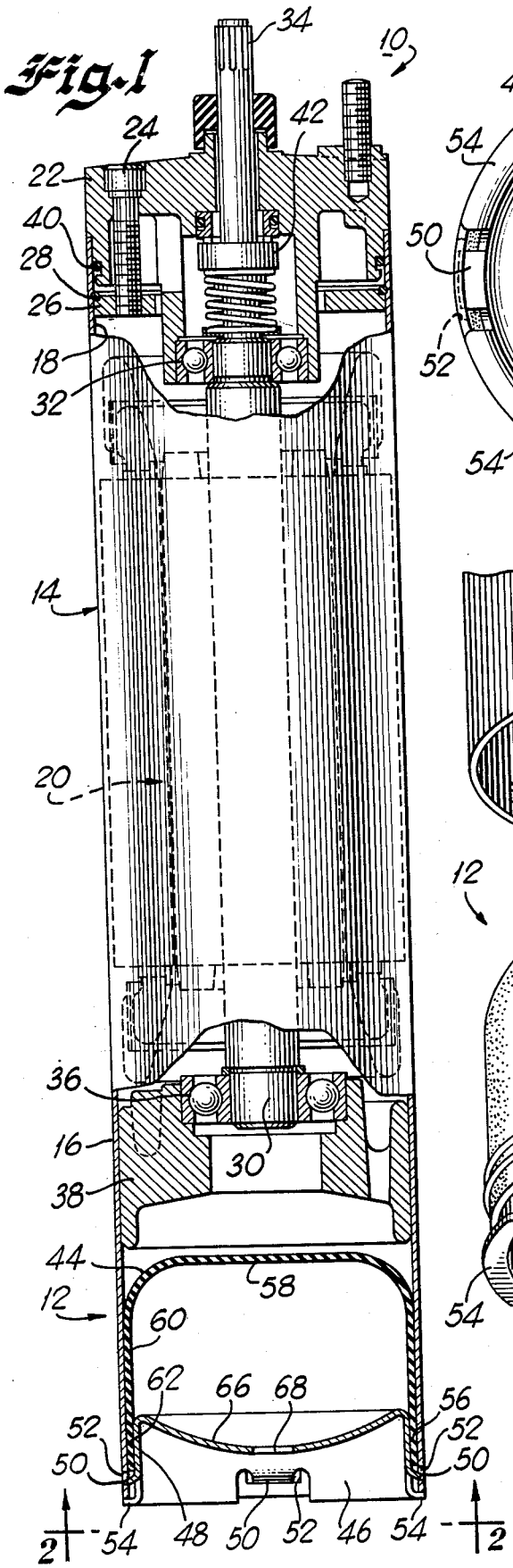
FIG. 1 is a side view, partly in section, of a submersible motor provided in accordance with the present invention with an improved assembly for sealing and pressure equalization.
Figure 2:
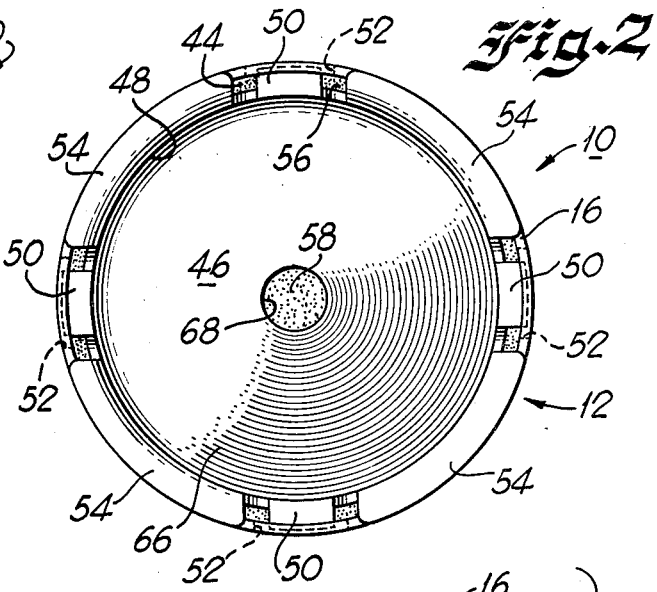
FIG. 2 is an end view of the submersible motor of FIG. 1 taken from the line 2—2 of FIG. 1.
Figure 3:
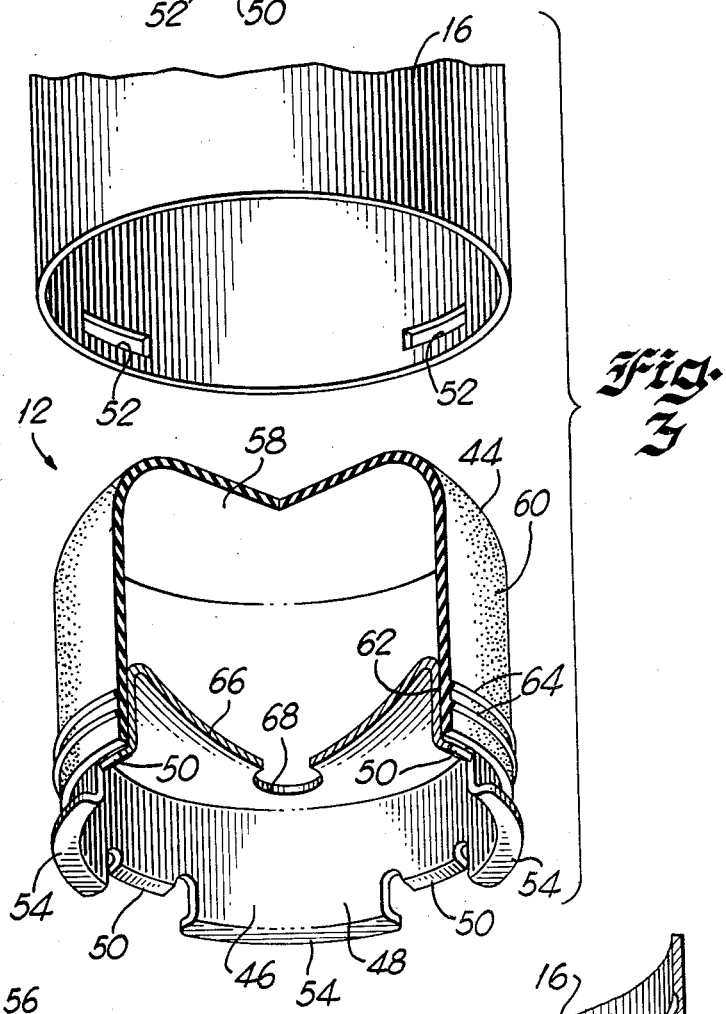
FIG. 3 is a partly broken away, partial perspective view of the assembly for sealing and pressure equalization in a partly assembled condition.

With reference now to the drawings, and initially to FIGS. 1–3, there is illustrated a submersible motor generally designated as 10, provided, in accordance with the principles of the present invention, with an improved sealing and pressure equalization structure generally designated as 12. In general, the assembly 12 serves to close one end of a housing 14 of the motor 10 and to assure that fluid contained within the housing 14 is pressurized to the same pressure as fluid surrounding the pump motor 10.

The principles of the present invention are applicable to the sealing and pressure equalization of many types of devices wherein mixing of and pressure differentials between contained and external fluids are to be avoided. In the illustrated arrangement, the pump motor 10 comprises an electric motor intended to be submerged in a liquid to be pumped by a pump (not shown) driven by the motor. Such motors may be supplied in many sizes, types and configurations. In the illustrative arrangement depicted in the drawings, the housing 14 of the motor 10 includes a circular cylindrical, elongated housing wall 16 defining an internal chamber 18 within which are positioned the rotor and stator components of an electrical motor structure 20 together with suitable electrical connections (not shown). One end of the wall 16 is closed by an end cap and bearing support 22 fastened in place by means of screws 24 threaded into a support plate 26 located within wall 16 by means of a snap ring 28.

Motor structure 20 may be of any desired construction and is not illustrated in detail since a description thereof is not necessary to an understanding of the present invention. The motor includes a drive shaft 30, and one end of the shaft is journalled in a bearing assembly 32 supported by housing 22. This end of the shaft extends from the motor housing 14 and is provided with a spline structure 34 for coupling of the drive shaft to a pump assembly. The opposite end of the motor shaft 30 is journalled in a bearing assembly 36 carried by a bearing support 38 disposed within the cylindrical wall 16.

The pump motor 10 illustrated in FIG. 1 is adapted to be submerged to an appreciable depth in a fluid to be pumped, for example water. Thus, the motor must be able to withstand pressurized environments. Moreover, it is necessary that the surrounding water or other fluid be prevented from seeping or leaking into the chamber 18 where it would damage the motor 20. In addition, as in the illustrated arrangement, it may be that the interior of the housing 14 is oil filled, in which case it is necessary to prevent mixture of the fluid within the housing 14 with the fluid external of the housing 14.

Although components of the housing 14 may be provided with suitable sealing elements, such as the seal 40 provided between the cylindrical wall 16 and the housing 22 and the seal assembly 42 provided between the housing 22 and the motor shaft 30, such sealing devices are not easily designed for withstanding large pressure differentials. Moreover, with large pressure differentials other problems such as collapse of portions of the housing 14 may be encountered.

In accordance with the present invention, the sealing and pressure equalization structure 12 is provided in order both to seal the housing 14 and to subject fluids within the housing 14 to a pressure equal to the pressure of surrounding fluids. The assembly 12 includes a fluid impervious flexible diaphragm 44 maintained in sealing engagement with an end of the cylindrical wall 16. One side of the diaphragm is subjected to fluid within the housing and the opposite side is subjected to external fluid so that, due to resilience of the diaphragm, the internal and external pressures are equalized.

The present invention provides an inexpensive and simple structure for assembling and holding the diaphragm 44 in position with respect to the wall 16. More specifically, the assembly 12 includes a retaining device generally designated as 46 preferably formed of stamped sheet metal in order to reduce weight, complexity, and cost. The device 46 includes an annular band portion 48 having a circular cylindrical shape complementary to the shape of housing wall 16 to the end that the band portion 48 may be assembled in telescoping relation with the wall 16.

In order to retain and locate the device 46 with respect to the wall 16, the band portion 48 is provided with a plurality of integral resilient locking tabs 50 sloping radially outward from the band portion 48. As the retaining device 46 is assembled to the wall 16, the tabs 50 enter latching slots 52 formed in the wall 16 and prevent inadvertent withdrawal of the device 46. The edge of the band portion 48 is provided with a lip structure 54 engageable with the outer edge of the housing 16 in order to limit movement of the device 46 with respect to the wall 16.

Although complementary in shape, the band portion 48 and the wall 16 are dimensioned to define therebetween an annular clearance or space 56. Diaphragm 44 is generally cup-shaped and includes an end wall 58 and a circular cylindrical side wall 60. Upon assembly of the diaphragm 44 with the retaining device 46 and the wall 16, the side wall 60 is captured in the space 56 between the band portion 48 and the wall 16.

In order to facilitate assembly of these components, and in accordance with a feature of the invention, there is provided an adhesive bond indicated by the reference numeral 62 between the band portion 48 and the diaphragm side wall 60. The bond 62 is produced by the use of a suitable adhesive in a gluing operation prior to assembly of the diaphragm 44 and device 46 into the wall 16. Once the adhesive bond is formed, the elements 44 and 46 can be easily inserted as a unit into the wall 16.

In order to provide for reliable sealing of the diaphragm 44 against the wall 16 and to reduce the force required for sliding assembly of the diaphragm 44 into the wall 16, the diaphragm side wall 60 is provided with uninterrupted beads 64. When the diaphragm 44 and retaining device 46 are assembled into the position illustrated in FIG. 1, the band portion 48 functions to press the diaphragm side wall 60 and thus the beads 64 into firm sealing engagement with the wall 16 so that leakage of fluids between the chamber 18 and the exterior of the motor 10 is prevented.

The retaining device 46 also serves to protect the diaphragm 44, and for this reason is provided with a base wall 66 connected at its peripheral edge with the band portion 48. Ample clearance is provided between the base wall 66 and the bearing support 38 for free diaphragm movement. Moreover, in order to provide fluid communication from the exterior of the motor 10 to the diaphragm 44, the base wall 66 is provided with an opening 68.

Figure 4:
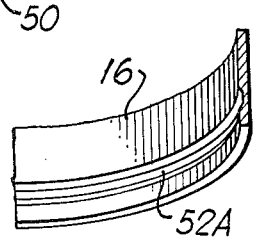
FIG. 4 is a fragmentary sectional view of a portion of an alternative housing configuration.

In FIG. 4 of the drawing, there is illustrated an alternative housing configuration in which the wall 16 is provided with a continuous groove 52A in place of discrete slots 52. In this arrangement it is not necessary to locate tabs 50 in an aligned position prior to assembly.

While the invention has been described in connection with reference to details of the illustrated embodiment, such details are not intended to limit the invention as defined in the following claims.

What is claimed and desired to be secured by Letters Patent of the United States is:

1. An assembly for sealing and pressure equalization of a submersible, fluid-filled device, said assembly comprising:

a housing with a generally circular cylindrical wall defining an open end;

a sheet metal retaining member including a cylindrical band portion having a circular cylindrical shape complementary to the shape of the housing end wall;

an imperforate, generally cup-shaped diaphragm having an end wall and having a circular cylindrical side wall complementary in shape to said band portion;

said housing wall and said band member defining a circular cylindrical annular space therebetween;

the side wall of said diaphragm sandwiched in said space between said band member and said housing wall and pressed into sealing engagement with said housing wall by said band member;

recess means defined in a circle circumscribing *the interior of* said housing wall spaced from the open end of the housing wall;

a plurality of locking tabs integral with said sheet metal retaining member and disposed in a circular array on said band portion;

said tabs sloping and extending radially outwardly from said band;

said tabs being resiliently compressed inwardly upon insertion of said retaining member into the housing, and expanding into said recess means to prevent withdrawal of said retaining member from the housing; and lip means defined on the edge of said band portion engageable with the edge of the open end of the housing;

the axial distance from said lip means to said tabs being substantially equal to the axial distance from said recess means to said housing edge.

2. The assembly of claim 1, said retaining member comprising a cup-shaped body including a base wall with its periphery connected to said band portion, and aperture means formed in said retaining member permitting fluid communication with said diaphragm.

3. The assembly of claim 2, said retaining member and said housing wall defining a chamber within the housing; said diaphragm [base] *end* wall being disposed within said chamber.

4. The assembly of claim 1, further comprising an adhesive bond between said band portion and said diaphragm side wall.

5. The assembly of claim 1, further comprising sealing means on said diaphragm side wall abutting against the housing wall.

6. The assembly of claim 5, said sealing means comprising at least one continuous bead encircling said diaphragm side wall.

7. The assembly of claim 1, said recess means comprising a plurality of slots extending through said housing wall.

8. The assembly of claim 1, said recess means comprising a groove in the inner surface of said housing wall.

*9. An assembly for sealing and pressure equalization of a device subject to internal and external fluid pressures and including a housing with a generally cylindrical open ended interior wall, said assembly comprising retaining means having a cylindrical band member with exterior wall structure spaced from said interior wall and an imperforate cup-shaped open ended flexible diaphragm having a cylindrical side wall sandwiched in said space against adjacent portions of said interior wall and exterior wall structure; said assembly being characterized in that said exterior wall structure is dimensioned to press against the interior of and to press the exterior of the diaphragm side wall against the interior wall of the housing, said housing interior wall having recess means defined in a circle spaced inwardly from the open end thereof and located below the open end of the diaphragm, and said retaining means has circularly arrayed locking structure below the open end of the diaphragm and extending outwardly beyond the diaphragm side wall into said recess means.*

*10. An assembly for sealing and pressure equalization of a device subject to internal and external pressures, said assembly comprising: a housing with a generally circular cylindrical wall defining an open end; a retaining member including a cylindrical band portion having a circular cylindrical shape complementary to the shape of the housing end wall; an imperforate, generally cup-shaped diaphragm having an end wall and having a circular cylindrical side all complementary in shape to said band portion; said retaining member being insertable into the open end of the housing with said band portion in a concentric, telescoped position relative to said housing wall; said housing wall and said band member defining a circular cylindrical annular space therebetween; the side wall of said diaphragm sandwiched in said space between said band member and said housing wall and pressed into sealing engagement with said housing wall by said band member; recess means defined in a circle circumscribing the interior of said housing wall and spaced from the open end of the housing wall; resilient inwardly compressible locking structure integral with said retaining member disposed in a circular array on and extending radially outwardly beyond the diaphragm from said band portion; said locking structure being movable inwardly upon insertion of said retaining member into the housing and expanding into said recess means to prevent withdrawal of said retaining member from the housing.*

*11. An assembly as claimed in claims 9 or 10, wherein said recess means is a continuous groove in the housing interior wall and said locking structure extends radially outwardly into said groove at the lower end of the exterior wall structure of the band member.*

* * * * *